(12) United States Patent
Miller

(10) Patent No.: US 11,420,493 B2
(45) Date of Patent: Aug. 23, 2022

(54) SPACE FRAME FRONT LOWER SUSPENSION CONNECTION

(71) Applicant: Caterpillar Inc., Peoria, IL (US)

(72) Inventor: Tad W. Miller, Bonney Lake, WA (US)

(73) Assignee: Caterpillar Inc., Peoria, IL (US)

( * ) Notice: Subject to any disclaimer, the term of this patent is extended or adjusted under 35 U.S.C. 154(b) by 479 days.

(21) Appl. No.: 16/664,169

(22) Filed: Oct. 25, 2019

(65) Prior Publication Data

US 2021/0122211 A1 Apr. 29, 2021

(51) Int. Cl.
*B60G 99/00* (2010.01)
*B62D 21/11* (2006.01)

(52) U.S. Cl.
CPC ............ *B60G 99/002* (2013.01); *B62D 21/11* (2013.01); *B60G 2206/14* (2013.01); *B60G 2206/8201* (2013.01)

(58) Field of Classification Search
CPC .............. B60G 99/002; B60G 2206/14; B60G 2200/144; B60G 2300/026; B60G 2300/07; B60G 2300/09; B60G 3/20; B62D 21/11; B62D 21/09; B62D 21/12; B62D 27/023

See application file for complete search history.

(56) References Cited

U.S. PATENT DOCUMENTS

| | | | |
|---|---|---|---|
| 3,149,856 A * | 9/1964 | Schilberg | B62D 25/2036 280/795 |
| 9,650,078 B2 | 5/2017 | Kinsman et al. | |
| 9,701,341 B2 | 7/2017 | Ormiston et al. | |
| 9,731,773 B2 | 8/2017 | Gami et al. | |
| 9,783,041 B2 | 10/2017 | Uranaka et al. | |
| 10,155,543 B2 | 12/2018 | Uranaka et al. | |
| 2007/0047082 A1 | 3/2007 | Seaver et al. | |
| 2012/0085588 A1 | 4/2012 | Kinsman et al. | |

(Continued)

FOREIGN PATENT DOCUMENTS

| | | | | |
|---|---|---|---|---|
| CN | 205059108 | | 3/2016 | |
| CN | 109551983 A | * | 4/2019 | ............ B60G 11/08 |

(Continued)

*Primary Examiner* — Jonathan Ng
*Assistant Examiner* — Scott F. Underwood
(74) *Attorney, Agent, or Firm* — Oblon, McClelland, Maier & Neustadt

(57) ABSTRACT

A front lower suspension connection for a space frame comprises a U-shaped base and upper suspension control arm support sections on the U-shaped base. The U-shaped base can have a cross-beam section and suspension column support beam sections positioned at opposite ends of the cross-beam section, where each suspension column support beam section may include lower suspension control arm pivot joint supports located at opposite ends of the suspension column support beam sections. Each upper suspension control arm support section can have a first support column and a second support column spaced from the first support column, where the first support column may include a first upper suspension control arm pivot joint support, and the second support column may include a second upper suspension control arm pivot joint support and a front mounting surface. A rear mounting may be provided on a rear surface of the front lower suspension connection.

20 Claims, 7 Drawing Sheets

(56) References Cited

U.S. PATENT DOCUMENTS

| | | | |
|---|---|---|---|
| 2013/0241237 A1* | 9/2013 | Dziuba | B62D 63/025 |
| | | | 296/193.04 |
| 2014/0035259 A1* | 2/2014 | Koren | B62D 21/11 |
| | | | 280/638 |
| 2016/0089945 A1 | 3/2016 | Kuwabara et al. | |
| 2017/0008565 A1* | 1/2017 | Murata | B62D 27/023 |
| 2017/0320522 A1 | 11/2017 | Lorenz et al. | |
| 2018/0118266 A1 | 5/2018 | Nishikawa et al. | |
| 2018/0281863 A1* | 10/2018 | Daikokuya | B62D 21/155 |
| 2021/0070369 A1* | 3/2021 | Innami | B62D 21/11 |

FOREIGN PATENT DOCUMENTS

| | | | | |
|---|---|---|---|---|
| GB | 686685 | | 1/1953 | |
| KR | 2008100091433 | | 10/2008 | |
| WO | WO-2007080281 A1 * | | 7/2007 | B60G 3/20 |

\* cited by examiner

SPACE FRAME FRONT LOWER SUSPENSION CONNECTION

TECHNICAL FIELD

The present disclosure relates to space frames, and more particularly to space frame front lower suspension connections, and systems, components, and methods thereof.

BACKGROUND

Conventional haul trucks, such as off-highway rear haul trucks, may use welded steel frames that can be extremely heavy and may require many meters of welding to fabricate a completed frame. Space frames offer a lighter and stronger alternative to traditional welded steel frames, since far less steel is required. As a result, space frames offer considerable benefits in terms of cost, manufacturability, and performance. For example, haul trucks with space frames comparatively can haul larger payloads and consume less fuel.

Conventional space frame structures may use fabricated nodal connections. Such nodal connections may be used to create space frame structures associated with static applications. However, vehicular applications are, at least in part, dynamic in nature, and haul trucks can represent a particularly difficult application because of loads applied to the space frame as well as bending, twisting, and/or flexing that can occur as the haul truck travels on various types of terrain, such as off highway terrain. Carefully designed high-strength castings and fabrications can be required to provide appropriate stiffness and flexibility characteristics while insuring proper load transfer from the dump body to the wheels.

U.S. Pat. No. 10,183,706 ("the '706 patent") describes a node for interconnecting frame members of a frame. According to the '706 patent, a plurality of cup-shaped node connectors are disposed on the node body, where each of the node connectors includes a closed end attached to the node body and an open end opposite the closed end and extending away from the node body. The '706 patent also describes that a sidewall extends between and connects the closed end to the open end and a tenon is formed on the open end. According to the '706 patent, the tenon is shaped and sized to fit within a frame member, and a transition is formed between the sidewall and the tenon defining a peripheral, radially outward facing groove in cooperation with the frame member, where the groove is shaped and sized to receive a weld.

SUMMARY OF THE DISCLOSURE

In one aspect, a front lower suspension connection fabrication for a space frame of a haul truck is disclosed. The front lower suspension connection fabrication can comprise a pair of upper suspension control arm support sections each having a first support column and a second support column and configured to support a pair of upper suspension control arms, wherein the first support column includes a first upper suspension control arm pivot joint support, and a top surface configured to weldably attach a front upper suspension connection fabrication, and wherein the second support column includes a second upper suspension control arm pivot joint support, and a front mounting surface configured to weldably attach one or more of a horizontal frame tube and an angular frame tube. The front lower suspension connection fabrication can also comprise a U-shaped base having a cross-beam section and a pair of suspension column support beam sections oriented perpendicular to the cross-beam section and positioned at opposite ends of the cross-beam section, wherein each suspension column support beam section includes a pair of lower suspension control arm pivot joint supports located at opposite ends of the suspension column support beam sections and configured to support a pair of lower suspension control arms; and a rear mounting surface formed by intersection of the cross-beam section and the pair of upper suspension control arm support sections and configured to weldably attach four horizontal front frame tubes In another aspect, a space frame for a rear haul truck is disclosed. The space frame can be comprised of a front lower suspension connection fabrication; and a plurality of frame tubes fixedly attached to the front lower suspension connection fabrication. The front lower suspension connection fabrication can include a pair of upper suspension control arm support sections each having a first support column and a second support column spaced in a first direction from the first support column, wherein the first support column includes a first upper suspension control arm pivot joint support, and the second support column includes a second upper suspension control arm pivot joint support and a front mounting surface, a U-shaped base having a cross-beam section and a pair of suspension column support beam sections positioned at opposite ends of the cross-beam section and spaced from each other in a second direction perpendicular to the first direction, wherein each suspension column support beam section includes a pair of lower suspension control arm pivot joint supports located at opposite ends of the suspension column support beam sections, and a rear mounting surface, wherein a first set of the plurality of frame tubes is fixedly attached to the front mounting surface of a first one of the second support columns, wherein a second set of plurality of frame tubes is fixedly attached to the front mounting surface of a second one of the second support columns, and wherein a third set of the plurality of frame tubes is fixedly coupled to the rear mounting surface.

And in yet another aspect, a method regarding a front lower suspension connection is disclosed. The method can comprise providing a U-shaped base of the front lower suspension connection; and providing a pair of upper suspension control arm support sections of the front lower suspension connection on the U-shaped base, wherein the U-shaped base has a cross-beam section and a pair of suspension column support beam sections spaced from each other and positioned at opposite ends of the cross-beam section, each suspension column support beam section including a pair of lower suspension control arm pivot joint supports located at opposite ends of the suspension column support beam sections, wherein each of the upper suspension control arm support sections has a first support column and a second support column spaced from the first support column, the first support column including a first upper suspension control arm pivot joint support, and the second support column including a second upper suspension control arm pivot joint support and a front mounting surface, and wherein a rear mounting is provided on a rear surface of the front lower suspension connection.

Other features and aspects of this disclosure will be apparent from the following description and the accompanying drawings.

DETAILED DESCRIPTION

Figure 1:
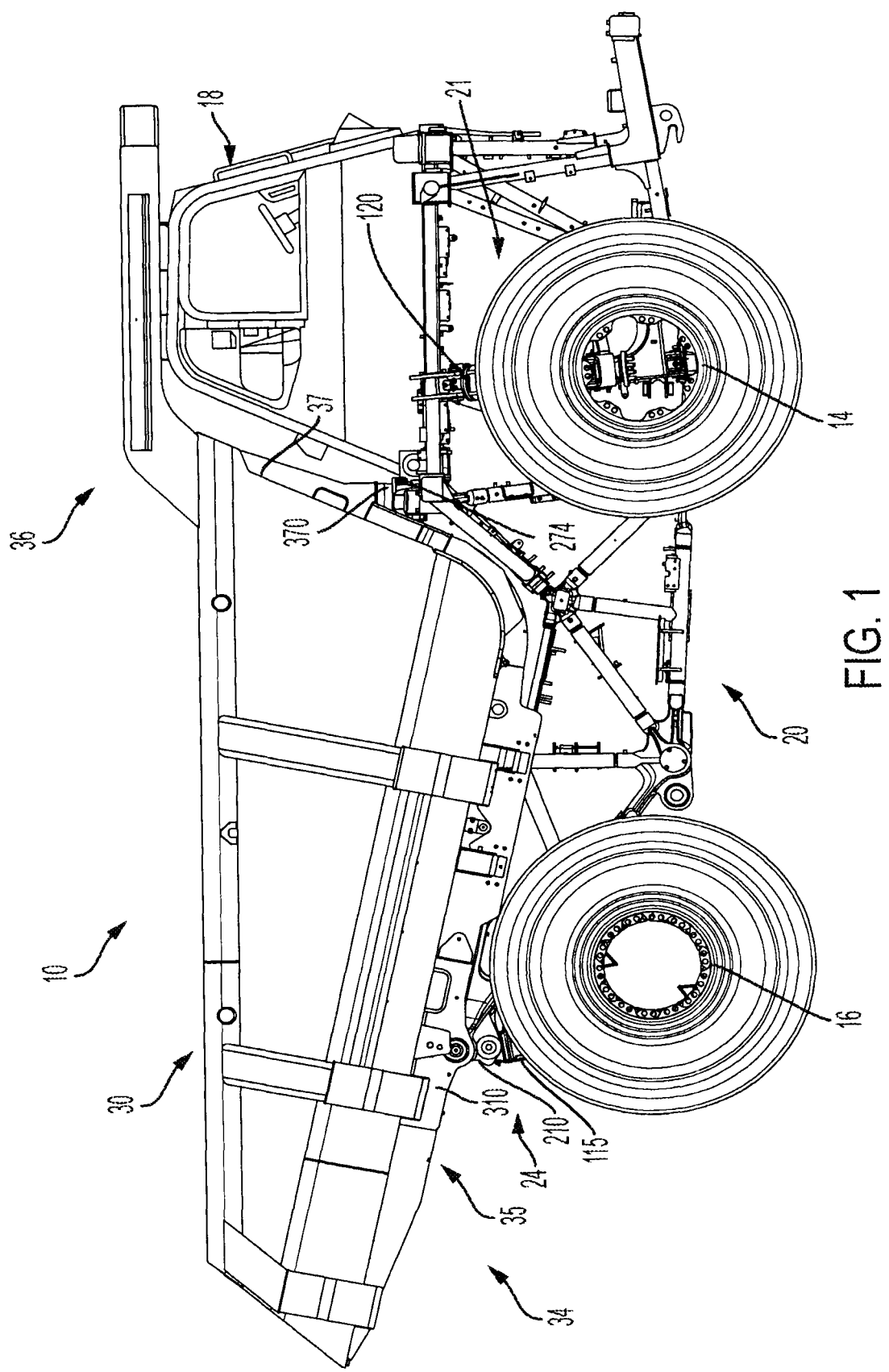
FIG. 1 is a side view of a machine according to embodiments of the disclosed subject matter.
Figure 2:
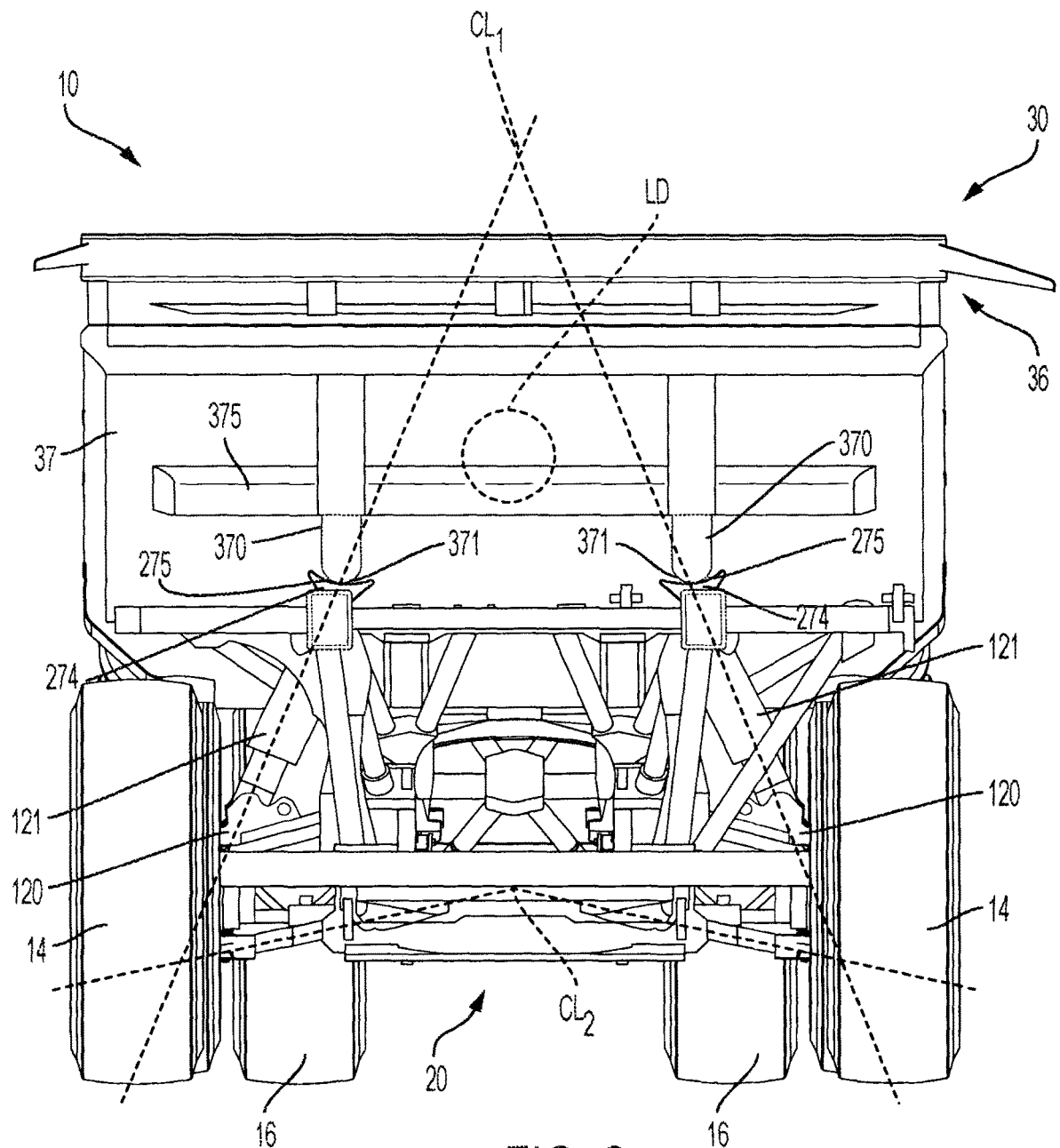
FIG. 2 is a front view of the machine of FIG. 1 with an operator cabin thereof removed to show a space frame and a dump body thereof according to embodiments of the disclosed subject matter.

Referring now to the drawings and with specific reference to FIG. 1 and FIG. 2, these figures illustrate an exemplary embodiment of a machine 10. Machine 10 may be a mobile machine that performs some type of operation associated with an industry such as mining, construction, or any other industry known in the art. For example, as shown in FIG. 1 and FIG. 2, machine 10 may be an earth moving machine, particularly, an off-highway rear haul truck 10.

Machine 10 may have a space frame 20 supported by front wheels 14 and rear wheels 16 (including respective tires). The front and rear wheels 14, 16 may be connected to space frame 20 by front suspension members and rear suspension systems, respectively. Machine 10 may also include a bed or body 30 supported by the space frame 20. Such bed or body 30 may be referred to herein as a dump body 30. The dump body 30 can be configured as a receptacle to receive hauling material.

A rear portion 34 of the dump body 30 can be pivotably coupled or attached to a portion (including portions) at a rear 24 of the space frame 20. Discussed in more detail below, portions of the dump body 30 between the rear portion 34 and a front portion 36 of the dump body 30 can be movably positioned relative to respective portions of the space frame 20 to support the dump body 30 on the space frame 20 at a rest position of the dump body 30. The rest position of the dump body 30 may be considered as positioning of the dump body 30 such that the front portion 36 of the dump body 30 is at a lower-most position (i.e., not raised). The dump body 30 can be pivoted at the rear portion 34 about the rear 24 of the space frame 20 to raise or lower the portion of the dump body 30 in front of the pivot (and hence move the portion of the dump body 30 behind the pivot in the opposite direction). Such pivoting of the dump body 30 to raise the front portion 36 of the dump body 30 can be to dump content from within the dump body 30. Likewise, pivoting of the dump body 30 to lower the front portion 36 of the dump body 30 to the rest position can be to receive content in the dump body 30.

Machine 10 may have an operator cabin 18 supported by the space frame 20 at a front of the space frame 20. Machine 10 may also be equipped with a steering mechanism and controls to move the machine 10 and controls to raise and lower dump body 30. The steering mechanism and the controls may be located within the operator cabin 18 of the machine 10.

Machine 10 may have a prime mover (not expressly shown) supported by the space frame 20. Generally, the prime mover may be provided in a space 21 of the space frame 20 at a front 26 of the space frame 20. The prime mover may be configured to propel the front and rear wheels 14, 16 in the forward or rearward direction. The prime mover may be lengthwise aligned on space frame 20 along a travel direction of the machine 10. One skilled in the art will recognize, however, that the prime mover may be aligned transversally. In one exemplary embodiment, the prime mover may be an internal combustion engine, which may be a two-stroke or four-stroke diesel engine, for instance. One skilled in the art will recognize, however, that the prime mover may be any other type of internal combustion engine, such as a gasoline engine or a gaseous fuel-powered engine. The prime mover may be connected to front and/or rear wheels 14, 16 via other components such as a drive train (not shown) to transfer motive power to move the front and/or rear wheels 14, 16 in a forward or rearward direction.

Exhaust from the prime mover may be output from one or more exhaust outputs (not expressly shown). Optionally, the one or more exhaust outputs may be provided generally between the operator cabin 18 and a front wall 37 of the dump body 30 such that exhaust is provided toward at least a predetermined portion of the front wall 37. A coupling (e.g., bellows) may be provided to connect the one or more exhaust outputs to the front wall 37 of the dump body 30, for instance, to a heating channel provided in or on the front wall 37 of the dump body 30 to heat the material carried in the dump body 30.

In general, a space frame according to embodiments of the disclosed subject matter, such as space frame 20, may be a frame that includes structural members connected to each other at nodes and/or joints. The structural members can include hollow tubes and/or solid tubes, and in some instances can be connected according to a triangulated structural. The structural members can be made of metal, metal alloys, or reinforced composite materials, for instance.

Figure 3:
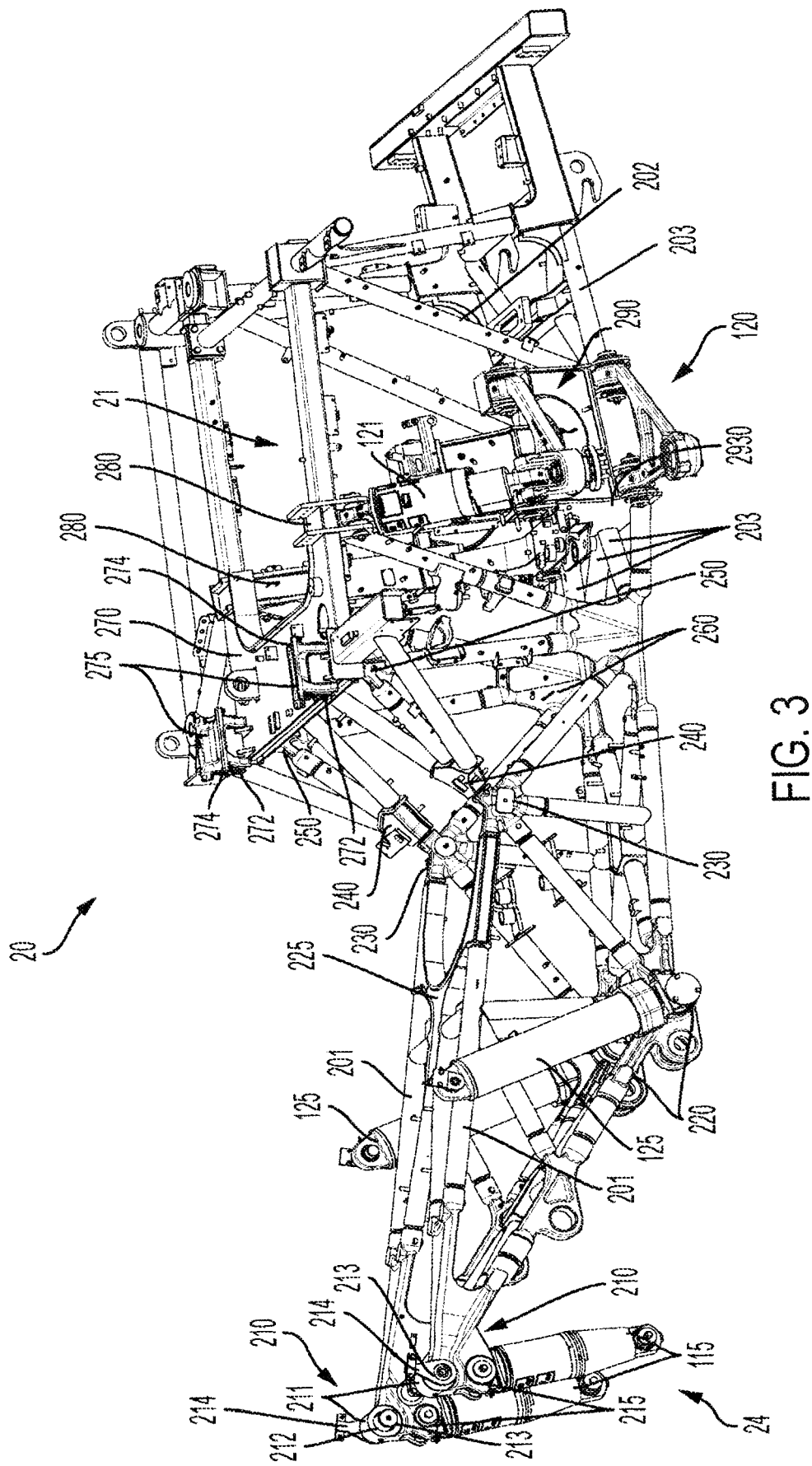
FIG. 3 is a side view of a space frame according to embodiments of the disclosed subject matter.
Figure 4:
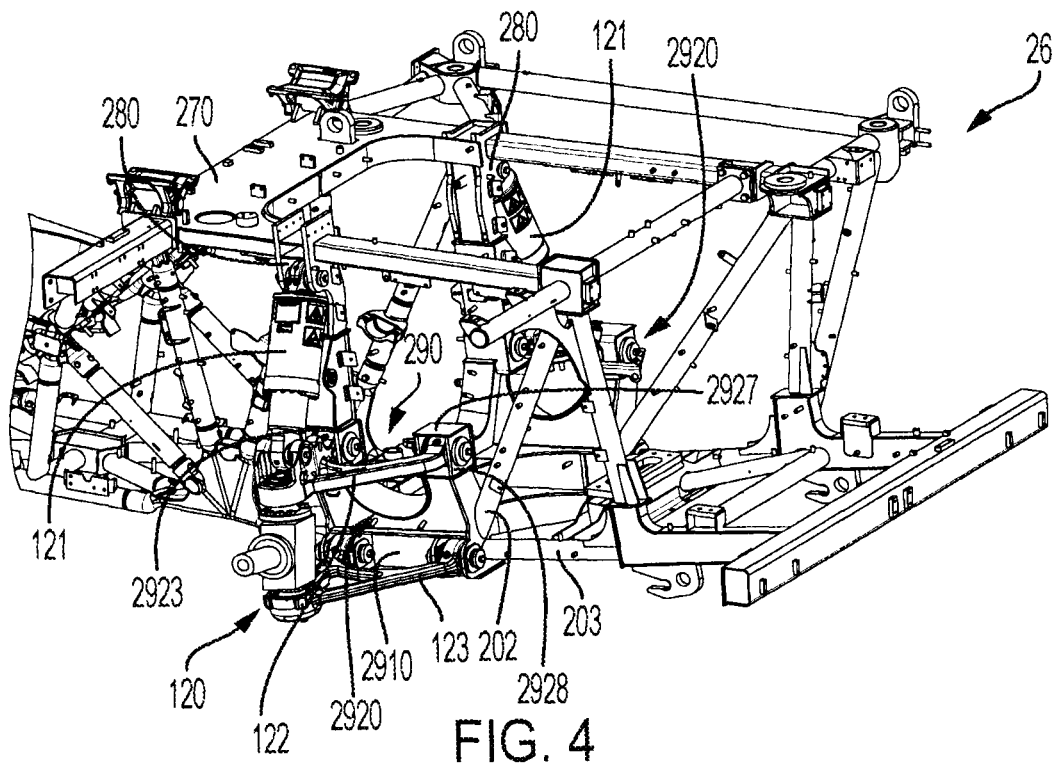
FIG. 4 is a side perspective view of portions of a front lower suspension connection according to embodiments of the disclosed subject matter.

FIG. 3 is a more detailed view of the space frame 20. As shown, the space frame 20 can include a pair of rear frame connections 210 at the rear 24 of the space frame 20, a pair of center lower frame connections 220, a center upper horizontal frame connection 225, a pair of center upper frame connections 230, a pair of center upper frame nodal connections 240, a pair of front upper frame connections 250, a pair of front lower frame connections 260, a front upper frame connection 270, a pair of front upper suspension connections 280 toward the front 26 of the space frame 20, and a front lower suspension connection 290 toward the front 26 of the space frame 20. Though the foregoing connections are described as pairs, the connections of a pair may not be identical. For instance, the connections of a pair may be symmetrical, generally, but not necessarily identical. The foregoing connections can be castings or fabrications. In general, a casting may refer to a connection that is not welded to another support component of the space frame 20, and a fabrication may refer to a connection that is welded to another support component of the space frame 20.

The center lower frame connections 220 and corresponding connections can be as set forth in U.S. application Ser. No. 16/663,892 filed Oct. 25, 2019 (Case 19-0767); the center upper frame connection 225 and corresponding connections can be as set forth in U.S. application Ser. No. 16/663,930 filed Oct. 25, 2019 (Case 19-0768); the center upper frame connections 230 and corresponding connections can be as set forth in U.S. application Ser. No.

16/664,042 filed Oct. 25, 2019 (Case 19-0773); the center upper frame nodal connections 240 and corresponding connections can be as set forth in U.S. application Ser. No. 16/663,955 filed Oct. 25, 2019 (Case 19-0771); the front upper frame connections 250 and corresponding connections can be as set forth in U.S. application Ser. No. 16/664,010 filed Oct. 25, 2019 (Case 19-0772); the front lower frame connections 260 and corresponding connections can be as set forth in U.S. application Ser. No. 16/664,104 filed Oct. 25, 2019 (Case 19-0762); and/or the front upper suspension connection 280 and corresponding connections can be as set forth in U.S. application Ser. No. 16/664,124 filed Oct. 25, 2019 (Case 19-0759). The foregoing applications are incorporated herein by reference in their entireties.

The space frame 20 can also include a plurality of elongate support members, such as elongate support members 201, elongate support members 202, and elongate support members 203. Elongate support members, according to embodiments of the disclosed subject matter, can be in the form of rods and/or tubes, circular in cross section, for instance, where some or all of the rods and/or tubes may be solid or hollow.

Each elongate support member 201 can be provided between the rear frame connections 210 and the front upper frame connection 270 in a top plan view of the space frame 20. More specifically, each elongate support member 201 can be provided between the center upper horizontal frame connection 225 and one of the rear frame connections 210. Further, each elongate support member 201 can extend lengthwise generally horizontally, in this case rearward from the center upper horizontal frame connection 225 at a positive acute angle relative to a horizontal plane running through the front wheels 14 and the rear wheels 16. In that the elongate support members 201 are provided at an outer portion of the space frame 20 in a width direction of the space frame 20, the elongate support members 201 may be considered outer elongate support members 201. As an example, the outer elongate support members 201 may be outer frame tubes.

Each rear frame connection 210, which may be a casting, can have a rear support 211 and a rear suspension node 215. Discussed in more detail below, the rear support 211 can directly support the dump body 30, and the rear suspension node 215 can be coupled to a rear suspension member 115 of the rear suspension system. The rear frame connections 210 can also be coupled to a plurality of elongate support members, including elongate support members 201. According to one or more embodiments of the disclosed subject matter, each of the rear frame connections 210 can be seven-point connections. For instance, according to embodiments of the disclosed subject matter, the rear frame connections 210 and corresponding connections can be as set forth in U.S. application Ser. No. 16/663,815 filed Oct. 25, 2019 (Case 19-0764), which is incorporated herein by reference in its entirety.

The rear support 211 can be configured as a pivot pin boss with a pivot pin bore or opening 212. According to one or more embodiments, an outer surface of the rear support 211 (i.e., pivot pin boss) and the pivot pin bore 212 can be cylindrical. An axis of the pivot pin bore 212 can extend in a width direction of the space frame 20. Moreover, the axes of the pivot pin bores 212 from the rear supports 211 of the pair of rear frame connections 210 may be aligned with each other. That is, the axes of the pivot pin bores 212 can be coaxial or common. The pivot pin bore 212 can be configured to receive a pivot pin of a pivot pin interface 213 such that the pivot pin interface 213 is pivotally coupled to the rear support 211 via the pivot pin bore 212 and the pivot pin interface 213 can pivot or rotate about the axes of the pivot pin bore 212 and the pivot pin of the pivot pin interface 213. Discussed in more detail below, the pivot pin interface 213 can also be coupled to a bottom 35 of the dump body 30.

As shown in FIG. 3, the front upper frame connection 270 can be fixedly coupled to the front upper suspension connections 280, and a bottom of the front upper frame connection 270 can be fixedly coupled to the front upper frame connections 250. Additionally, the front upper frame connection 270, which may be a fabrication, can have a body with a pair of rocker attachment interfaces 272 on a top surface thereof. According to one or more embodiments, the front upper frame connection 270 and corresponding connections can be as set forth in U.S. application Ser. No. 16/663,849 filed Oct. 25, 2019 (Case 19-0766), which is incorporated herein by reference in its entirety.

The rocker attachment interfaces 272 can be spaced from each other in a width direction of the space frame 20, for instance, provided at opposite outer lateral edges of the body of the front upper frame connection 270, such as shown in FIG. 3. Each rocker attachment interface 272 can have a pivot pin bore configured to receive a pivot pin. Optionally, the pivot pin can be considered part of the rocker attachment interface 272. An axis of rotation for the pivot pin bore and the pivot pin can run horizontally or substantially horizontally in a length direction of the space frame 20. Moreover, the axes of rotation for the rocker attachment interfaces 272 can be parallel to each other.

Each rocker attachment interface 272 can have rotatably or pivotally attached thereto a support rocker 274 via the pivot pin. In that the rocker attachment interfaces 272 can be spaced apart from each other in the width direction of the space frame 20, so too can be the support rockers 274. Moreover, the support rockers 274 can rotate or pivot laterally or in a width direction of the space frame 20 about the respective axes of rotation defined by the rocker attachment interfaces 272.

According to embodiments of the disclosed subject matter, each support rocker 274 can have an upward-facing contact surface 275. The upward-facing contact surface 275 can be concave, for instance, semi-cylindrical, elliptical, or multi-planar. Additionally, the upward-facing contact surface 275 can be or include a padding. According to embodiments of the disclosed subject matter, the support rocker 274 and/or components thereof, can be according to U.S. application Ser. No. 16/663,512 filed Oct. 25, 2019 (Case 18-1266) and/or U.S. application Ser. No. 16/663,551 filed Oct. 25, 2019 (Case 19-0783), each of which is incorporated herein by reference in its entirety. Discussed in more detail below, the support rockers 274, particularly the upward-facing contact surfaces 275 thereof, can receive a portion of corresponding vertical support structures 370 of the dump body 30 (see FIG. 9).

Referring now to FIGS. 4-8, the front lower suspension connection 290, which can be a fabrication, can have a U-shaped base 2900 and a pair of upper suspension control arm support sections 2920 provided on the U-shaped base 2900. As shown, the upper suspension control arm support sections 2920 can extend upward from the U-shaped base 2900. Optionally, the upper suspension control arm support sections 2920 can curve slightly outward from the U-shaped base 2900 when extending from the U-shaped base 2900. According to one or more embodiments, the U-shaped base 2900 and the upper suspension control arm support sections 2920 can be integral or fabricated in one piece. Generally, in an overhead plan view, the front lower suspension connection 290 can have a width greater than a length, where the width can be in terms of the width direction of the space frame 20 and the length can be in terms of the length direction of the space frame 20.

The U-shaped base 2900, which can also have a width greater than a length, can have a cross-beam section 2902 and a pair of suspension column support beam sections 2910. The suspension column support beam sections 2910 can be spaced apart from each other and positioned at opposite ends of the cross-beam section 2902. In general, the suspension column support beam sections 2910 can extend perpendicular from the cross-beam section 2902.

Figure 5:
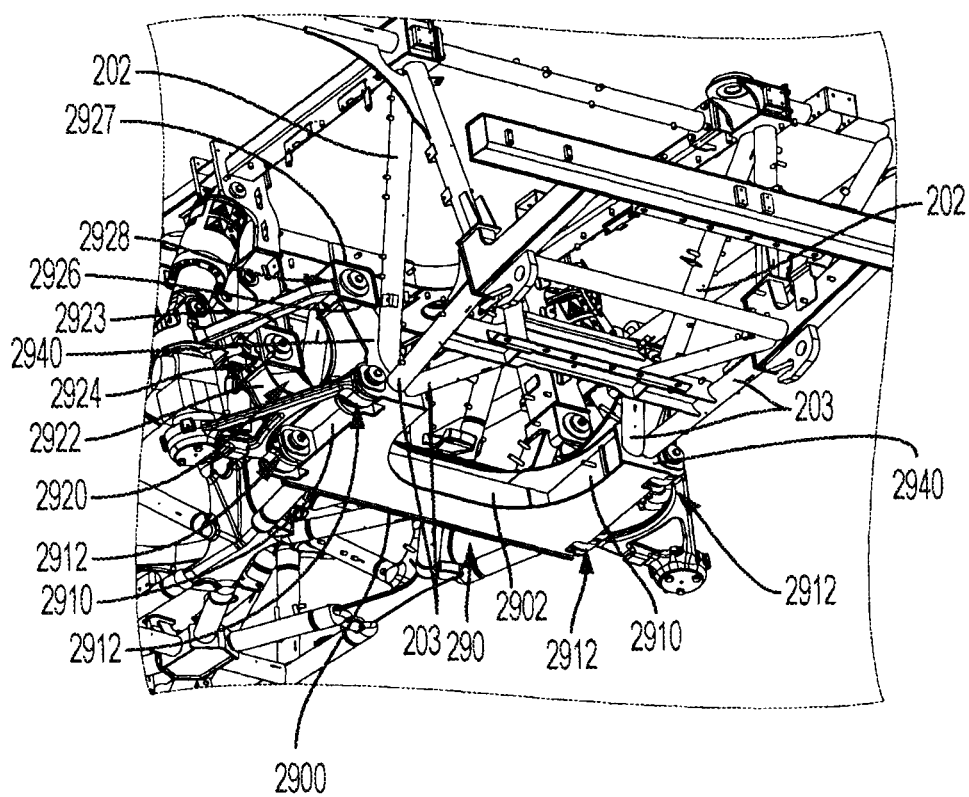
FIGS. 5 and 6 are bottom perspective views of portions of the front lower suspension connection of FIG. 4.
Figure 6:
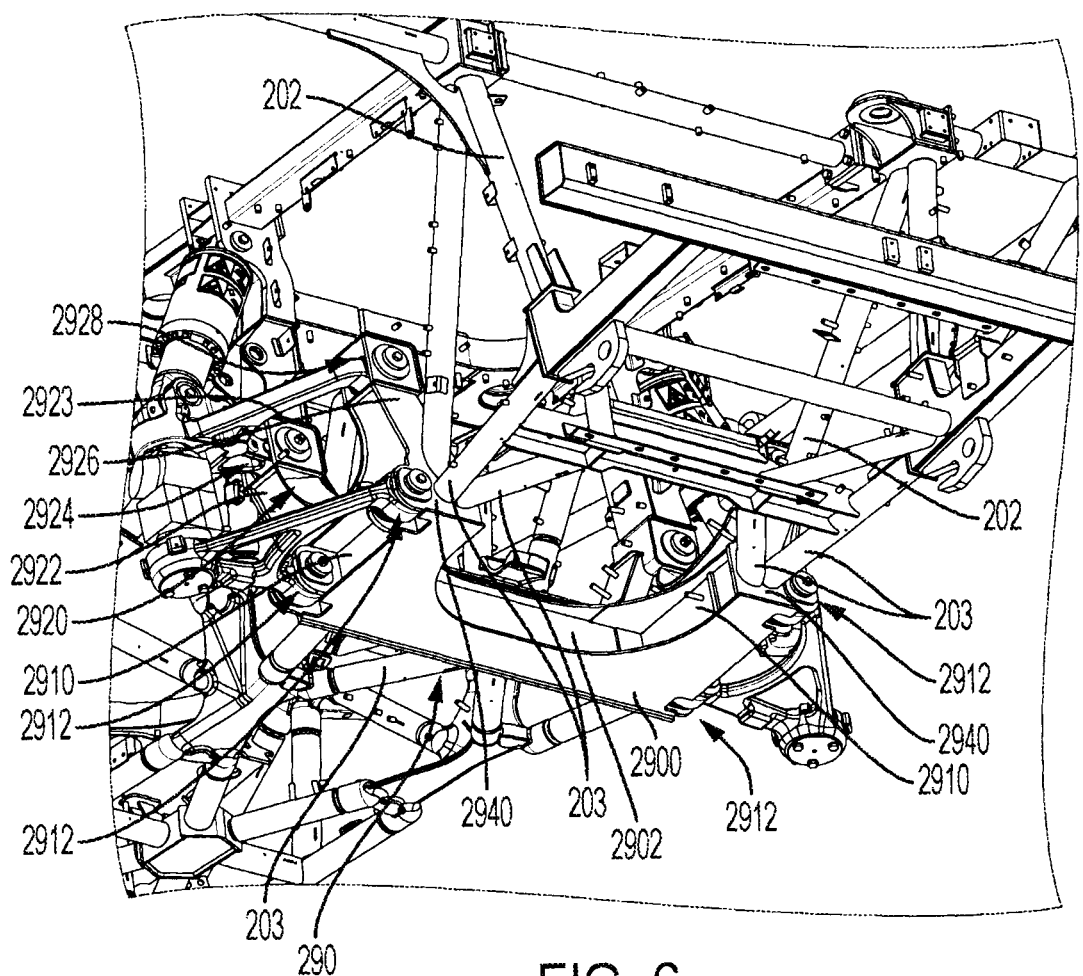
Figure 7:
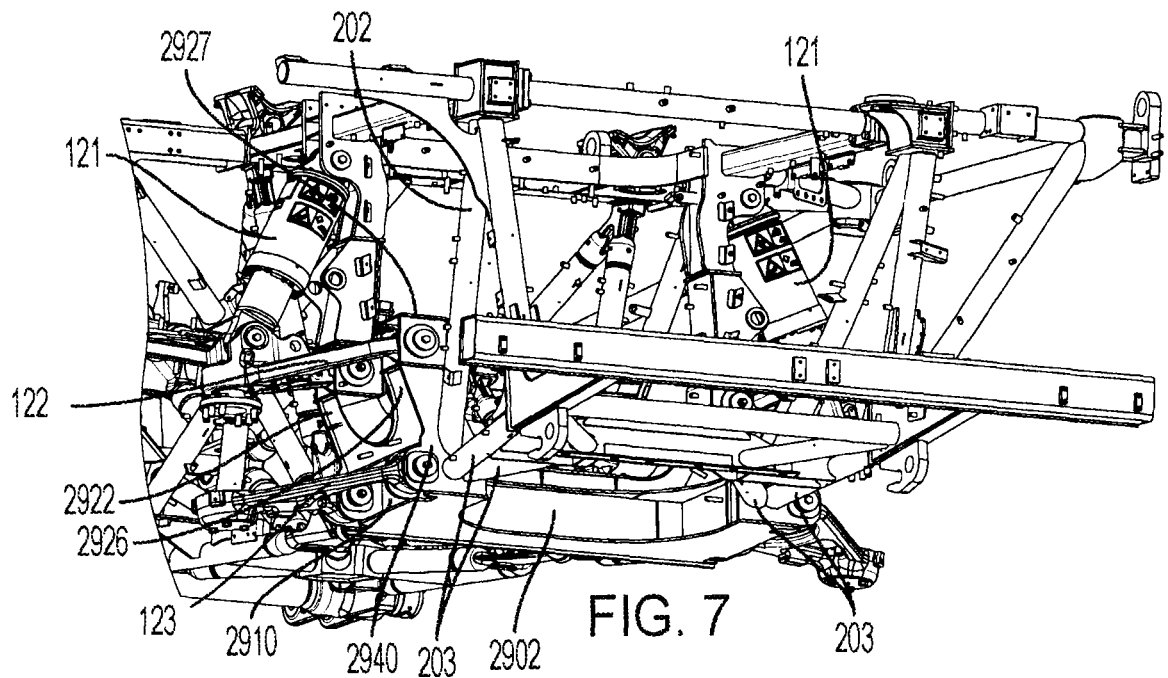
FIG. 7 is a front view of portions of the front lower suspension connection of FIG. 4.

According to embodiments of the disclosed subject matter, a top surface of the U-shaped base 2900 and/or a bottom surface thereof opposite the top surface, one or both of which may be flat, can overlap the cross-beam section 2902 and the suspension column support beam sections 2910, such as shown in FIG. 5 and FIG. 6. For example, the top surface and/or the bottom surface can completely overlap the cross-beam section 2902 and the suspension column support beam sections 2910. Thus, respective portions of the top and/or bottom surfaces may be considered part of the U-shaped base 2900 or the suspension column support beam sections 2910, as the case may be. Optionally, the top and bottom surfaces can project from respective edges, for instance, inner edges of the cross-beam section 2902 and the suspension column support beam sections 2910. According to one or more embodiments, the top surface and/or the bottom surface can form the U-shape for the U-shaped base 2900. Of course, the underlying cross-beam section 2902 and suspension column support beam sections 2910, according to one or more embodiments, can also for the U-shape form the U-shaped base 2900. As shown in FIG. 5 and FIG. 6, for instance, the U-shapes for the U-shaped base 2900 and the top surface and/or the bottom surface may be different. The suspension column support beam sections 2910 can be respectively vertically under the upper suspension control arm support sections 2920. Each suspension column support beam section 2910 can include a pair of lower suspension control arm pivot joint supports 2912. The lower suspension control arm pivot joint supports 2912 per side can be located on opposite ends of the corresponding suspension column support beam section 2910.

The lower suspension control arm pivot joint supports 2912 can face outward. According to one or more embodiments, the lower suspension control arm pivot joint supports 2912 of one suspension column support beam section 2910 can face a first outward direction and the lower suspension control arm pivot joint supports 2912 of the other suspension column support beam section 2910 can face a second outward direction opposite the first outward direction. Optionally, each of the lower suspension control arm pivot joint supports 2912 can form an enclosure adapted to at least partially enclose and form a pivotal interface with a lower suspension control arm 123 of the front suspension member 120.

Each pair of upper suspension control arm support sections 2920 can be U-shaped in a side view of the front lower suspension connection 290. According to one or more embodiments, the width of the U-shaped base 2900 can be greater than a length of the upper suspension control arm support sections 2920, where length can be in terms of the length direction of the space frame 20. According to one or more embodiments, the U-shape of the upper suspension control arm support sections 2920 can be more narrow than the U-shape of the U-shaped base 2900.

Each upper suspension control arm support section 2920 can have a first support column 2922 and a second support column 2926. The first support column 2922 can be spaced from the second support column 2926 in the length direction of the upper suspension control arm support sections 2920. The first support columns 2922 can extend upward from respective rear corners of the U-shaped base 2900, for instance, from rear portions of the suspension column support beam sections 2910. The second support columns 2926 can extend upward from front portions of the U-shaped base 2900, for instance, from forward portions of the suspension column support beam sections 2910. According to one or more embodiments, the first support columns 2922 generally can be over respective rear ones of the lower suspension control arm pivot joint supports 2912, and the second support columns 2926 can be over respective front ones of the lower suspension control arm pivot joint supports 2912.

Each of the first support columns 2922 can include a top surface or interface 2923 and a first upper suspension control arm pivot joint support 2924. Each of the second support columns 2926 can include a top surface 2927 and a second upper suspension control arm pivot joint support 2928. The top surface 2927 can be a free end of the second support column 2926, free and entirely exposed, for instance.

According to one or more embodiments, the first upper suspension control arm pivot joint supports 2924 and the second upper suspension control arm pivot joint support 2928 can face outward. For example, a first set of one of the first upper suspension control arm pivot joint supports 2924 and one of the second upper suspension control arm pivot joint supports 2928 of one upper suspension control arm support section 2920 can face a first outward direction and a second set of one of the first upper suspension control arm pivot joint supports 2924 and one of the second upper suspension control arm pivot joint supports 2928 of the other upper suspension control arm support section 2920 can face a second outward direction opposite the first outward direction. Optionally, each of the first upper suspension control arm pivot joint supports 2924 and/or the second upper suspension control arm pivot joint supports 2928 can form an enclosure adapted to at least partially enclose and form a pivotal interface with an upper suspension control arm 122 of the front suspension member 120.

A rear surface of the front lower suspension connection 290 can be comprised of rear surfaces of the U-shaped base 2900 and rear surfaces of the upper suspension control arm support sections 2920, such as rear surfaces of the first support columns 2922. The rear surface may define one or more rear mounting surfaces 2930. The rear mounting surfaces 2930 may be provided on the rear surface of the U-shaped base 2900. For example, the rear mounting surfaces 2930 may be provided at or formed by an intersection of the cross-beam section 2902 and the upper suspension control arm support sections 2920. Optionally, the rear mounting surfaces 2930 may be provided below the intersection, for instance, entirely on the rear surface of the cross-beam section 2902. Alternatively, the rear mounting surfaces 2930 may be entirely on the rear surfaces of the suspension column support beam sections 2910. As yet another variation, the rear mounting surfaces 2930 may be on rear surfaces of the cross-beam section 2902 and the suspension column support beam sections 2910.

A front surface of the front lower suspension connection 290 can be comprised of front surfaces of the U-shaped base 2900 and front surfaces of the upper suspension control arm support sections 2920, such as front surfaces of the second support columns 2926. The front surface may define one or more front mounting surfaces 2940.

The front mounting surfaces 2940 may be provided on front surfaces of the U-shaped base 2900. For example, the front mounting surfaces 2940 may be provided on front surfaces of the upper suspension control arm support sections 2920. Additionally or alternatively, the front mounting surfaces 2940 may be provided on front surfaces of the second support columns 2926. Thus, the front mounting surfaces 2940 can be only on front surfaces of the upper suspension control arm support sections 2920, only on front surfaces of the second support columns 2926, or on both.

The front lower suspension connection 290 can be adapted to be in direct contact with the front upper suspension connections 280. In particular, the top surfaces 2923 of the first support columns 2922 can be adapted to directly interface with bottom surfaces or interfaces of the front upper suspension connections 280. For example, the top surfaces 2923 of the first support columns 2922 can be adapted to be fixedly attached (e.g., weldably attached) to respective bottom surfaces or interfaces of the front upper suspension connections 280.

The upper suspension control arm support sections 2920 can be adapted to be pivotally coupled to respective upper suspension control arms 122. In particular, the first upper suspension control arm pivot joint support 2924 and the second upper suspension control arm pivot joint support 2928 can be adapted to pivotally couple respective upper suspension control arms 122.

The suspension column support beam sections 2910 can be adapted to be pivotally coupled to respective lower suspension control arms 123. In particular, the lower suspension control arm support sections 2912 can be adapted to pivotally couple respective lower suspension control arms 123.

Figure 8:
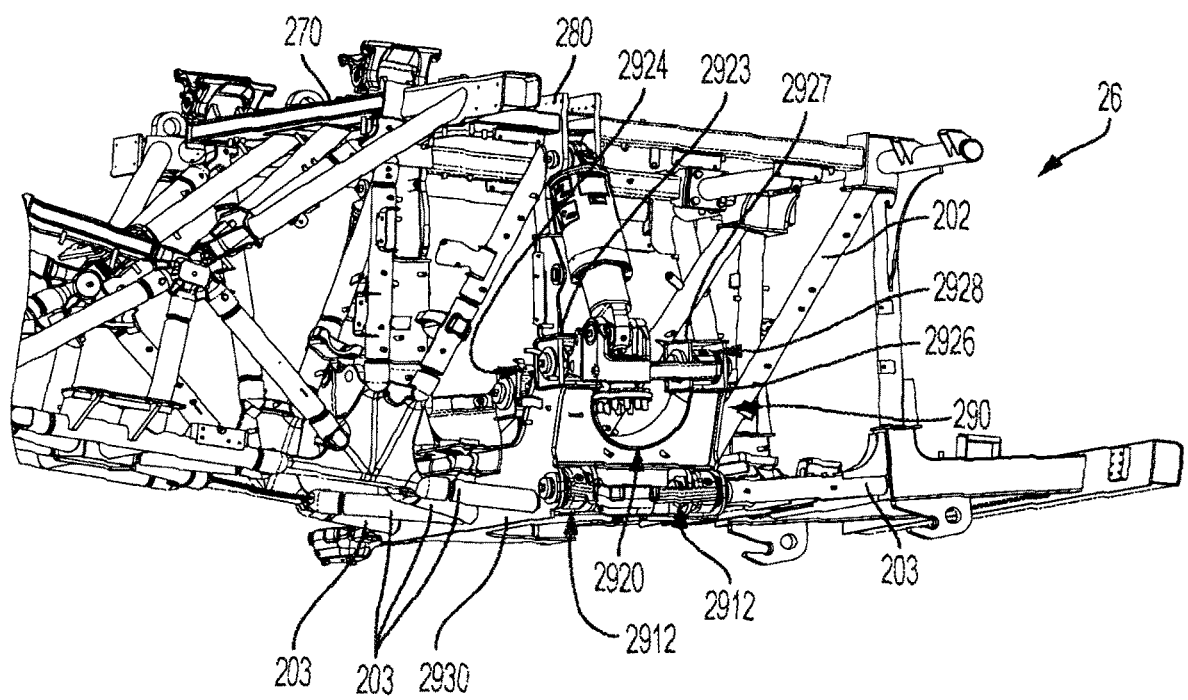
FIG. 8 is a side view of portions of the front lower suspension connection of FIG. 4.

The rear mounting surfaces 2930 can be adapted to have fixedly attached (e.g., weldably attached) thereto one or more elongate support members. For instance, FIG. 8 shows rear mounting surfaces 2930 being adapted to have four elongate support members 203 extending therefrom. Elongate support members 203 may extend horizontally or substantially horizontally (e.g., 1-2 degrees from horizontal). Moreover, elongate support members 203 may extend from the rear mounting surfaces 2930 at angles in a top plan view of the space frame 20.

The front mounting surfaces 2940 can be adapted to have fixedly attached (e.g., weldably attached) thereto one or more elongate support members. For instance, FIGS. 4-8 show front mounting surfaces 2940 being adapted to have six elongate support members, four elongate support members 203 and two elongate support members 202, extending therefrom. Elongate support members 203 may extend horizontally or substantially horizontally (e.g., 1-2 degrees from horizontal). Elongate support members 202 may extend at an angle, for instance, an acute angle relative to horizontal. Moreover, elongate support members 202 and/or elongate support members 203 may extend from the rear mounting surfaces 2930 at angles in the top plan view of the space frame 20.

Figure 9:
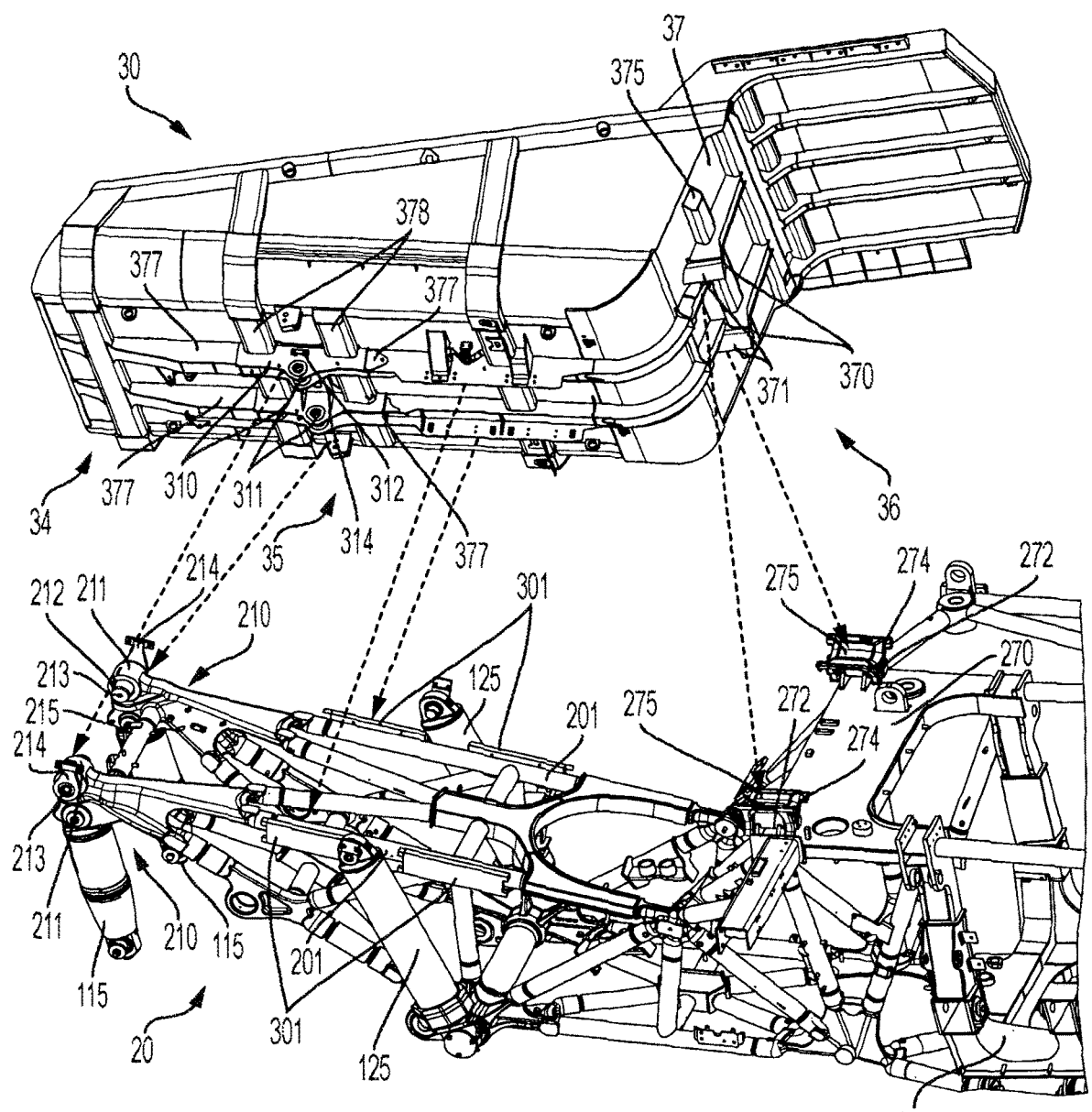
FIG. 9 is an exploded view of the space frame and dump body to show defined contact points according to embodiments of the disclosed subject matter.

Turning now to FIG. 9, the dump body 30 can have, on the bottom 35 thereof, a rear pivot support 310 and a pair of flat contact surfaces 301, and on the front wall 37 thereof, a pair of vertical support structures 370.

The rear pivot support 310 can be provided at the rear portion 34 of the dump body 30, such as shown in FIG. 9. The rear pivot support 310 can have a pair of rear pivots 311. The rear pivots 311 can be spaced apart from each other in a width or lateral direction of the dump body 30, such as shown in FIG. 9. The rear pivot support 310 can also include a cross-member 314, which can be provided between the rear pivots 311, fixedly connected to or part of the rear pivots 311 (i.e., integral and/or one-piece with).

The rear pivot support 310 can be fixedly coupled to the bottom 35 of the dump body 30. For example, the rear pivot support 310 can be welded to the bottom 35 of the dump body 30. More specifically, according to one or more embodiments of the disclosed subject matter, each rear pivot 311 can be welded to a corresponding longitudinal body support member 377 on the bottom of the dump body 30. As shown in FIG. 9, for instance, each rear pivot 311 can be welded in-line with the corresponding longitudinal body support member 377. Thus, the rear pivot 311 can be considered as part of the longitudinal body support member 377 (i.e., integral and/or one-piece with).

Each rear pivot 311 can also include a plurality of cut-outs, for instance, two cut-outs, spaced apart from each other in a length direction of the dump body 30. Each cut-out can receive or accept a transverse body support member 378. Moreover, the cut-outs of one of the rear pivots 311 can receive different transverse body support members 378, for instance, adjacent transverse body support members 378, such as shown in FIG. 9. Additionally, as shown, each transverse body support member 378 can extend through one cut-out of one rear pivot 311 and through an opposing cut-out of the other rear pivot 311.

According to one or more embodiments of the disclosed subject matter, the rear pivots 311 can also include an attachment interface 312 on an outer side surface thereof, such as shown in FIG. 9. As a non-limiting example, the attachment interface 312 can include a pair of projections configured to mate with corresponding notches of the pivot pin interface 213. The rear pivot support 310 and corresponding connections can be as set forth in U.S. application Ser. No. 16/663,627 filed Oct. 25, 2019 (Case 19-0763), which is incorporated herein by reference in its entirety.

The rear pivots 311 can be pivotally coupled to the rear supports 211 of the space frame 20 via the pivot pin interface 213. More specifically, for each rear pivot 311/rear support 211 pair, the rear support 211 can be provided in a pivot bore of the rear pivot 311 (e.g., between the two pivot bore portions of a single rear pivot 311) such that the pivot bore 212 of the rear support 211 is aligned with the pivot bore and such that a pin of the pivot pin interface 213 extends through the pivot bore 212 of the rear support 211 and the pivot bore of the rear pivot 311. An arm 214 of the pivot pin interface 213 can have one or more notches configured to be mated with corresponding one or more projections of the attachment interface 312.

The pivot pin interface 213 can be held in place by way of the interconnection between the notches of the pivot pin interface 213 and the projections of the attachment interface 312. Moreover, the arm 214 can be fixedly coupled to the attachment interface 312. For example, a bracket can be fixedly or removably coupled to the projections, over the arm 214 of the pivot pin interface 213, to prevent the pivot pin interface 213 from moving laterally outward from the rear pivot 311. The bracket can be fixed to the projections via bolts, rivets, or welding as non-limiting examples.

The bottom 35 of the dump body 30 can include the plurality of flat contact surfaces 301, such as shown in FIG. 9. The flat contact surfaces 301 may be in the form of a plate, such as a rectangular or square plate, though embodiments of the disclosed subject matter are not limited to the foregoing geometries. Optionally, the flat contact surfaces 301 can have a chamfered portion on a bottom edge thereof. The flat contact surfaces 301 can be provided generally at a middle portion of the dump body 30. In a top plan view of the dump body 30, the pair of flat contact surfaces 301 can be between the rear pivot support 310 and the pair of vertical support structures 370 in the length direction of the dump body 30. Additionally, the flat contact surfaces 301 can be provided on corresponding longitudinal support body members 377. For instance, the flat contact surfaces 301 can be provided on inward-facing surfaces of the longitudinal support body members 377. Thus, in embodiments of the disclosed subject matter, the flat contact surfaces 301 can be vertically-oriented, such as shown in FIG. 9. Moreover, the flat contact surface 301 on one longitudinal support body member 377 can be spaced apart from the flat contact surface 301 on the opposing longitudinal support body member 377 in the width direction of the dump body 30. The flat contact surfaces 301 can be coupled to the longitudinal support body members 377, for instance, by welding, rivets, or bolts, as non-limiting examples.

According to one or more embodiments, each flat contact surface 301 can be comprised of a first flat contact surface portion and a second flat contact surface portion spaced from the first flat contact surface portion in the length direction of the dump body 30, such as shown in FIG. 9. Optionally, the first and second flat contact surface portions of the flat contact surface 301 may be of the same configuration. Of course, each flat contact surface 301, according to one or more embodiments of the disclosed subject matter, may be represented by a single flat contact surface (e.g., a single plate). For example, only one of the first or second flat contact surface portions shown in FIG. 9 may constitute the flat contact surface 301.

Discussed in more detail below, when the dump body 30 is in a lowered position (i.e., rest position), the flat contact surfaces 301 attached to the dump body 30 can be positioned as shown in FIG. 9. That is, the flat contact surfaces 301 can be provided adjacent to outer or lateral sides of the outer elongate support members 201. According to one or more embodiments, the flat contact surfaces 301 can be parallel to the outer elongate support members 201.

The vertical support structures 370 of the dump body 30 can extend from a front face of front wall 37 of the dump body 30. The vertical support structures 370 can be fixed to the front face of the front wall 37, for instance, via welding. The vertical support structures 370 can be spaced apart from each other in the width direction of the dump body 30. According to one or more embodiments, the vertical support structures 370 can be centered on opposite sides of a vertical centerline of the dump body 30 in a front view of the machine 10, such as shown in FIG. 2. The vertical support structures 370 can be as set forth in U.S. application Ser. No. 16/663,825 filed Oct. 25, 2019 (Case 19-0770), which is incorporated herein by reference in its entirety.

Vertical support structures 370 can be vertical in at least the front view of the dump body 30. Depending upon the configuration of the front wall 37 of the dump body 30, in a side view of the dump body 30 the vertical support structures 370 may be generally vertical, for instance, at an angle 10 degrees or less from vertical.

According to one or more embodiments, the vertical support structures 370 can extend through a horizontal support structure 375, which can also be fixed (e.g., welded) to the front face of the front wall 37. Intersecting surfaces of the horizontal support structure 375 and each vertical support structure 370 can be fixedly attached via welding, for instance. The horizontal support structure 375 can be as set forth in U.S. application Ser. No. 16/663,825 filed Oct. 25, 2019 (Case 19-0770), which, as noted above, is incorporated herein by reference in its entirety.

Each vertical support structure 370 can have a down-facing contact surface 371. According to one or more embodiments, the down-facing contact surface 371 can be convex, for instance, semi-cylindrical, elliptical, or multi-planar. The down-facing contact surfaces 371 can be configured to be received or seated in the upward-facing contact surfaces 275 of the support rockers 274. Unlike the support rockers 274, the vertical support structures 370, themselves, do not pivot.

INDUSTRIAL APPLICABILITY

As noted above, embodiments of the present disclosure relate to space frame front lower suspension connections, and systems, components, and methods thereof.

Embodiments of the disclosed subject matter can provide a lightweight, durable machine configuration with a reliable support definition of load points between the dump body 30 and the space frame 20, for instance, in light of dimensional variations due to tolerances and/or component deflection.

In terms of components of the space frame 20, the space frame 20 can include the front lower suspension connection 290, which can be a fabrication, and can include a U-shaped base 2900 and a pair of upper suspension control arm support sections 2920 provided on the U-shaped base 2900.

As shown in FIGS. 4-8, the upper suspension control arm support sections 2920 can extend upward from the U-shaped base 2900. According to one or more embodiments, the U-shaped base 2900 and the upper suspension control arm support sections 2920 can be integral or fabricated in one piece. Generally, in an overhead plan view, the front lower suspension connection 290 can have a width greater than a length, where the width can be in terms of the width direction of the space frame 20 and the length can be in terms of the length direction of the space frame 20.

The U-shaped base 2900, which can also have a width greater than a length, can have a cross-beam section 2902 and a pair of suspension column support beam sections 2910. The suspension column support beam sections 2910 can be spaced apart from each other and positioned at opposite ends of the cross-beam section 2902. In general, the suspension column support beam sections 2910 can extend perpendicular from the cross-beam section 2902.

Each suspension column support beam section 2910 can include a pair of lower suspension control arm pivot joint supports 2912. The lower suspension control arm pivot joint supports 2912 per side can be located on opposite ends of the corresponding suspension column support beam section 2910. According to one or more embodiments, the lower suspension control arm pivot joint supports 2912 can face outward for pivotally coupling the lower suspension control arm 123.

Each upper suspension control arm support section 2920 can have a first support column 2922 and a second support column 2926. The first support column 2922 can be spaced from the second support column 2926 in the length direction of the upper suspension control arm support sections 2920.

Each of the first support columns 2922 can include a top surface or interface 2923 and a first upper suspension control arm pivot joint support 2924, and each of the second support columns 2926 can include a top surface 2927 and a second upper suspension control arm pivot joint support 2928. The top surface 2927 can be a free end of the second support column 2926, free and entirely exposed, for instance.

According to one or more embodiments, the first upper suspension control arm pivot joint supports 2924 and the second upper suspension control arm pivot joint support 2928 can face outward for pivotally coupling the upper suspension control arm 122.

A rear surface of the front lower suspension connection 290 can be comprised of rear surfaces of the U-shaped base 2900 and rear surfaces of the upper suspension control arm support sections 2920, such as rear surfaces of the first support columns 2922. The rear surface may define one or more rear mounting surfaces 2930.

A front surface of the front lower suspension connection 290 can be comprised of front surfaces of the U-shaped base 2900 and front surfaces of the upper suspension control arm support sections 2920, such as front surfaces of the second support columns 2926. The front surface may define one or more front mounting surfaces 2940.

The front lower suspension connection 290 can be in direct contact with the front upper suspension connections 280. In particular, the top surfaces 2923 of the first support columns 2922 can directly interface with bottom surfaces or interfaces of the front upper suspension connections 280. For example, the top surfaces 2923 of the first support columns 2922 can be fixedly attached (e.g., weldably attached) to respective bottom surfaces or interfaces of the front upper suspension connections 280.

The upper suspension control arm support sections 2920 can be pivotally coupled to respective upper suspension control arms 122. In particular, the first upper suspension control arm pivot joint support 2924 and the second upper suspension control arm pivot joint support 2928 can be pivotally coupled to respective upper suspension control arms 122. Respective pivot pins may extend through openings of the first upper suspension control arm pivot joint support 2924 and the second upper suspension control arm pivot joint support 2928 and branches of the upper suspension control arms 122 to pivotally couple the upper suspension control arms 122 to the upper suspension control arm support sections 2920.

The suspension column support beam sections 2910 can be pivotally coupled to respective lower suspension control arms 123. In particular, the lower suspension control arm support sections 2912 can be pivotally coupled to respective lower suspension control arms 123. Respective pivot pins may extend through openings of the lower suspension control arm support sections 2912 and branches of the lower suspension control arms 123 to pivotally couple the lower suspension control arms 123 to the lower suspension control arm support sections 2912.

The rear mounting surfaces 2930 can have fixedly attached (e.g., weldably attached) thereto one or more elongate support members. For instance, FIG. 8 shows rear mounting surfaces 2930 having attached thereto four elongate support members 203. Elongate support members 203 may extend horizontally or substantially horizontally (e.g., 1-2 degrees from horizontal).

The front mounting surfaces 2940 can have fixedly attached (e.g., weldably attached) thereto one or more elongate support members. For instance, FIGS. 4-8 show front mounting surfaces 2940 having attached thereto six elongate support members, four elongate support members 203 and two elongate support members 202. Elongate support members 203 may extend horizontally or substantially horizontally (e.g., 1-2 degrees from horizontal). Elongate support members 202 may extend at an angle, for instance, an acute angle relative to horizontal.

According to embodiments of the disclosed subject matter, the dump body 30 can operatively contact the space frame 20 according to a predetermined contact arrangement. For example, embodiments of the disclosed subject matter can provide for a six-point contact arrangement between the dump body 30 and the space frame 20. According to embodiments of the disclosed subject matter, such contact arrangement can be provided when the dump body 30 is in a rest position. Rest position as used herein can mean that the dump body 30 is in a lower-most or fully down position and not raised by the lift cylinders 125, which may be coupled to the center lower frame connections 220.

Referring to FIG. 9, which shows an exploded view of the space frame 20 and the dump body 30 of the machine 10, a first pair of contact points can be provided by the rear supports 211 of the space frame 20 and the rear pivots 311 of the rear pivot supports 310 of the dump body 30. Each rear support 211 can be pivotally connected to the dump body 30 via the rear pivot 311. Such connection can allow the front portion 36 of the dump body 30 to be raised and lowered between upper-most and lower-most positions via rotation about the common pivot axis created by the connection between the rear supports 211 and the rear pivots 311.

A second pair of contact points can be provided by the positioning of the flat contact surfaces 301 relative to the elongate support members 201. In particular, the flat contact surfaces 301, which notably can be on or part of the dump body 30 and not the space frame 20, can be provided adjacent to outer or lateral sides of the elongate support members 201, such as shown in FIG. 9. As noted above, the flat contact surfaces 301 may be positioned parallel to the elongate support members 201. Additionally, according to one or more embodiments of the disclosed subject matter, the flat contact surfaces 301 can contact the elongate support members 201. Such positioning of the flat contact surfaces 301 can be when the dump body 30 is in the lower-most or rest position. Moreover, such positioning of the flat contact surfaces 301 can accommodate for lateral or horizontal forces from the corresponding the elongate support members 201 of the space frame 20. Additionally, as noted above, the flat contact surfaces 301 may have a chamfered portion on a bottom edge thereof. Such chamfered portion can aid in the centering of the dump body 30 when the dump body 30 is transitioned to the rest or fully down position.

A third pair of contact points can be provided by the positioning of the vertical support structures 370, particularly the down-facing contact surfaces 371 thereof, removably on the support rockers 274, particularly the upward-facing contact surfaces 275 thereof. According to embodiments of the disclosed subject matter, the down-facing contact surface 371 can be removably seated on the upward-facing contact surface 275. Additionally, in a front view of the machine 10 a vertical centerline axis of the down-facing contact surface 371 of each of the vertical support structures 370 can be offset from the axis of rotation (i.e., pivot axis) of a corresponding one of the support rockers 274. For example, as shown in FIG. 2, the vertical centerline axis of the down-facing contact surface 371 can be offset inward in a width direction of the machine 10 relative to the axis of rotation for the support rocker 274.

The vertical support structures 370, particularly the down-facing contact surfaces 371 when contacting the upward-facing contact surfaces 275 of the support rockers 274, can transfer loading through the space frame 20 to the front suspension system and the front wheels 14. Moreover, the vertical support structures 370 can provide support for horizontal components of force vectors with respect to the dump body 30 load being transferred through the space frame 20 and the front suspension system to the front wheels 14. Additionally, because the support rockers 274 can pivot laterally and independently of each other, and because both the support rockers 274 and the vertical support structures 370 have cooperating contact surfaces (i.e., upward-facing contact surfaces 275 and down-facing contact surfaces 371, respectively), proper seating between the vertical support structures 370 and the support rockers 274 can be maintained, particularly when the dump body 30 is in the at-rest position, even when the machine 10 is moving, for instance. Such arrangement, as diagrammatically shown in FIG. 2, can thus provide an even load distribution LD with respect to each side of the support arrangement (i.e., side to side or laterally).

Additionally shown in FIG. 2, in a front view the support rocker 274/vertical support structure 370 combinations can be located along longitudinal axes of respective front struts 121 connected to respective front suspension members 120 on same sides of the space frame 20. For example, the pivot axis of the support rocker 274 may be aligned with a longitudinal axis a corresponding front strut 121. The longitudinal axes can intersect at a point $CL_1$ at a vertical centerline at a top of the dump body 30. Of course, embodiments of the disclosed subject matter are not so limited, and the longitudinal axis of the front strut 121 may not be aligned with the support rocker 274/vertical support structure 370 combination, such as the pivot axis of the support rocker 274. Also shown in FIG. 2, longitudinal axes of additional suspension members on opposite sides of the space frame 20 can intersect at a point $CL_2$ at the same vertical centerline of the machine 10 as point $CL_1$. The arrangement of the third pair of contact points, therefore, can uniformly transfer load from the dump body 30 through the support rockers 274 and the space frame 20 to the front suspension system.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A front lower suspension connection fabrication for a space frame of a haul truck comprising:
   a pair of upper suspension control arm support sections each having a first support column and a second support column and configured to support a pair of upper suspension control arms,
      wherein the first support column includes:
         a first upper suspension control arm pivot joint support, and
         a top surface configured to weldably attach a front upper suspension connection fabrication, and
      wherein the second support column includes:
         a second upper suspension control arm pivot joint support, and
         a front mounting surface configured to weldably attach one or more of a horizontal frame tube and an angular frame tube;
   a U-shaped base having a cross-beam section and a pair of suspension column support beam sections oriented perpendicular to the cross-beam section and positioned at opposite ends of the cross-beam section, wherein each suspension column support beam section includes a pair of lower suspension control arm pivot joint supports located at opposite ends of the suspension column support beam sections and configured to support a pair of lower suspension control arms; and
   a rear mounting surface formed by intersection of the cross-beam section and the pair of upper suspension control arm support sections and configured to weldably attach four horizontal front frame tubes.

2. The front lower suspension connection fabrication of claim 1, wherein each of the upper suspension control arm support sections is U-shaped in a side elevational view of the front lower suspension connection fabrication.

3. The front lower suspension connection fabrication of claim 2, wherein the U-shape of the U-shaped base is wider than the U-shape of each of the U-shaped upper suspension control arm support sections.

4. The front lower suspension connection fabrication of claim 1, wherein a top surface of the second support column of each of the upper suspension control arm support sections is free and entirely exposed.

5. The front lower suspension connection fabrication of claim 1, wherein each of the first upper suspension control arm pivot joint support and the second upper suspension control arm pivot joint support forms an enclosure adapted to enclose respective portions of the upper suspension control arms.

6. The front lower suspension connection fabrication of claim 1, wherein a bottom surface of the U-shaped base is flat.

7. The front lower suspension connection fabrication of claim 1, wherein each of the first upper suspension control arm pivot joint support, the second upper suspension control arm pivot joint support, and the lower suspension control arm pivot joint supports faces outward.

8. The front lower suspension connection fabrication of claim 1, wherein a width of the U-shaped base in a first direction of the cross-beam section is greater than a length of the U-shaped base in a second direction perpendicular to the first direction.

9. A space frame for a rear haul truck comprising:
   a front lower suspension connection fabrication; and
   a plurality of frame tubes fixedly attached to the front lower suspension connection fabrication,
   wherein the front lower suspension connection fabrication includes:
      a pair of upper suspension control arm support sections each having a first support column and a second support column spaced in a first direction from the first support column, wherein the first support column includes a first upper suspension control arm pivot joint support, and the second support column includes a second upper suspension control arm pivot joint support and a front mounting surface,
      a U-shaped base having a cross-beam section and a pair of suspension column support beam sections positioned at opposite ends of the cross-beam section and spaced from each other in a second direction perpendicular to the first direction, wherein each suspension column support beam section includes a pair of lower suspension control arm pivot joint supports located at opposite ends of the suspension column support beam sections, and
      a rear mounting surface, wherein a first set of the plurality of frame tubes is fixedly attached to the front mounting surface of a first one of the second support columns, wherein a second set of the plurality of frame tubes is fixedly attached to the front mounting surface of a second one of the second support columns, and wherein a third set of the plurality of frame tubes is fixedly coupled to the rear mounting surface.

10. The space frame of claim 9, wherein a fourth set of the plurality of frame tubes is fixedly coupled to a first one of the suspension column support beam sections, and wherein a fifth set of the plurality of frame tubes is fixedly coupled to a second one of the suspension column support beam sections.

11. The space frame of claim 9, wherein the upper suspension control arm support sections are pivotally coupled to respective upper suspension control arms, and wherein the suspension column support beam sections are pivotally coupled to respective lower suspension control arms.

12. The space frame of claim 9, wherein each of the first upper suspension control arm pivot joint support, the second upper suspension control arm pivot joint support, and the lower suspension control arm pivot joint supports faces outward in the second direction.

13. The space frame of claim 9, wherein each of the first support columns of the upper suspension control arm support sections has a top surface fixedly attached to a front upper suspension connection fabrication.

14. The space frame of claim 9, wherein a width of the U-shaped base in the second direction is greater than a length of the U-shaped base in the first direction.

15. A method regarding a front lower suspension connection comprising:

providing a U-shaped base of the front lower suspension connection; and providing a pair of upper suspension control arm support sections of the front lower suspension connection on the U-shaped base, wherein the U-shaped base has a cross-beam section and a pair of suspension column support beam sections spaced from each other and positioned at opposite ends of the cross-beam section, each suspension column support beam section including a pair of lower suspension control arm pivot joint supports located at opposite ends of the suspension column support beam sections, wherein each of the upper suspension control arm support sections has a first support column and a second support column spaced from the first support column, the first support column including a first upper suspension control arm pivot joint support, and the second support column including a second upper suspension control arm pivot joint support and a front mounting surface, and wherein a rear mounting is provided on a rear surface of the front lower suspension connection.

16. The method of claim 15, further comprising fabricating the front lower suspension connection with the pair of upper suspension control arm support sections on the U-shaped base.

17. The method of claim 15, further comprising weldably attaching a top surface of each of the first support columns to respective front upper suspension connections, wherein respective top surfaces of the second support columns of the upper suspension control arm support sections are free ends and entirely exposed.

18. The method of claim 15, wherein each of the first upper suspension control arm pivot joint support, the second upper suspension control arm pivot joint support, and the lower suspension control arm pivot joint supports faces outward.

19. The method of claim 15, wherein each of the upper suspension control arm support sections is U-shaped, and wherein a width of the U-shaped base is greater than a length of the U-shaped upper suspension control arm support section, the width of the U-shaped base being perpendicular to the length of the U-shaped upper suspension control arm support section.

20. The method of claim 15, wherein the first support columns of the upper suspension control arm support sections extend upward from a rear end of the U-shaped base, and the second support columns of the upper suspension control arm support sections extend upward from a front end of the U-shaped base opposite the rear end.

* * * * *